US012263853B2

(12) United States Patent
Yamada et al.

(10) Patent No.: US 12,263,853 B2
(45) Date of Patent: Apr. 1, 2025

(54) DRIVING ASSIST SYSTEM

(71) Applicant: TOYOTA JIDOSHA KABUSHIKI KAISHA, Toyota (JP)

(72) Inventors: Masahiro Yamada, Toyota (JP); Hideo Suganuma, Okazaki (JP); Tetsuo Hayakawa, Kurokawa-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 84 days.

(21) Appl. No.: 18/461,725

(22) Filed: Sep. 6, 2023

(65) Prior Publication Data

US 2024/0157955 A1    May 16, 2024

(30) Foreign Application Priority Data

Nov. 15, 2022   (JP) ................... 2022-182931

(51) Int. Cl.
  *B60W 50/08*    (2020.01)
  *B60W 50/14*    (2020.01)
  *G08G 1/01*     (2006.01)

(52) U.S. Cl.
  CPC .......... *B60W 50/085* (2013.01); *B60W 50/14* (2013.01); *G08G 1/0129* (2013.01); *B60W 2420/403* (2013.01); *B60W 2420/408* (2024.01); *B60W 2510/0604* (2013.01); *B60W 2510/188* (2013.01); *B60W 2520/10* (2013.01); *B60W 2540/16* (2013.01); *B60W 2540/18* (2013.01); *B60W 2555/20* (2020.02)

(58) Field of Classification Search
  CPC ............... B60W 50/085; B60W 50/14; B60W 2420/403; B60W 2420/408; B60W 2510/0604; B60W 2510/188; B60W 2520/10; B60W 2540/16; B60W 2540/18; B60W 2555/20; B60W 50/035; B60W 50/08; B60W 2050/146; B60W 2510/182; B60W 2520/105; B60W 2552/00; B60W 2520/14; G08G 1/0129
  See application file for complete search history.

(56) References Cited

U.S. PATENT DOCUMENTS

| | | | |
|---|---|---|---|
| 2021/0229660 A1* | 7/2021 | Kamatani | ............. B60W 10/04 |
| 2022/0101667 A1* | 3/2022 | Ueda | .................... G07C 5/0808 |
| 2023/0045367 A1* | 2/2023 | Nakashima | ........ G06Q 30/0278 |

FOREIGN PATENT DOCUMENTS

JP    2007-323598 A    12/2007

* cited by examiner

*Primary Examiner* — Sizo B Vilakazi
(74) *Attorney, Agent, or Firm* — Oliff PLC

(57) ABSTRACT

A processing server detects an incident of a vehicle by analyzing one of position information about the vehicle, image information about the periphery of the vehicle, and traveling data about the vehicle, which are acquired from the vehicle, and selects a new function corresponding to the detected incident. Then, the processing server gives notice of the proposal for the new function to the vehicle, as an estimated timing when a user having encountered the incident has cooled down while the user's memory about the incident is clear.

4 Claims, 5 Drawing Sheets

DRIVING ASSIST SYSTEM

CROSS-REFERENCE TO RELATED APPLICATION

This application claims priority to Japanese Patent Application No. 2022-182931 filed on Nov. 15, 2022, incorporated herein by reference in its entirety.

BACKGROUND

1. Technical Field

The present disclosure relates to a driving assist system that proposes a function recommended for a user of a vehicle based on a driving history of the vehicle and the like, to the user.

2. Description of Related Art

Recent vehicles are often equipped with a driving assist function for preventing an accident before happens. However, driving habits for vehicles are different depending on users that are drivers, and therefore it is not realistic to equip a driving assist function matched to all users, in vehicles.

Japanese Unexamined Patent Application Publication No. 2007-323598 (JP 2007-323598 A) discloses a disclosure in which a driving assist such as the notification of appropriate driving information is performed depending on a traveling experience history of a user such as a driver or a passenger, even when the driver or the passenger rides in a different vehicle.

SUMMARY

However, in the disclosure described in JP 2007-323598 A, a function depending on the traveling experience history of the user is selected from driving assist functions that are previously implemented in the vehicle, and therefore, there is a fear that a function appropriate to the user cannot be recommended. Further, the timing when the user wants a new function is not considered, and therefore, there is a possibility that the user does not introduce a recommended new function.

In consideration of the above circumstance, the present disclosure has an object to provide a driving assist system that can propose a new function suitable for the user at an appropriate timing.

For achieving the above object, a driving assist system described in claim 1 includes: a state analysis unit that detects an incident of a vehicle by analyzing one of position information about the vehicle, image information about the periphery of the vehicle, and traveling data about the vehicle, the position information, the image information and the traveling data being acquired from the vehicle; a new-function selection unit that selects a new function corresponding to the incident; and a notification unit that gives notice of a proposal for the new function to the vehicle at a timing when the incident is resolved.

With the driving assist system described in claim 1, it is possible to propose the new function corresponding to the incident, to a user that has encountered the incident, at an estimated timing when the user has cooled down while the user's memory about the incident is clear.

In the driving assist system described in claim 2, the notification unit may give notice of the proposal for the new function to the vehicle, when the state analysis unit detects a case where the vehicle arrives at a garage of a user's home or at a destination registered in a car navigation system included in the vehicle and where a parking brake of the vehicle is turned on or a shift position of the vehicle becomes P.

With the driving assist system described in claim 2, it is possible to propose the new function at a timing when the vehicle arrives at the garage of the user's home or at the destination, that is, at an estimated timing when the user has cooled down while the user's memory about the incident is clear.

In the driving assist system described in claim 3, the new-function selection unit may select the new function by referring to data including a weather, a traffic condition and a topography at a place of occurrence of the incident at a time of the incident, the data being acquired from an information server.

With the driving assist system described in claim 3, it is possible to select an optimal new function by referring to information such as the weather at the time of the incident, in addition to the traveling state of the vehicle, and the like.

In the driving assist system described in claim 4, the traveling data may include change in the vehicle front-rear speed of the vehicle, change in the acceleration of the vehicle, change in the steering angle of the vehicle, change in the throttle opening degree of the vehicle, change in the brake pedal stepping force of the vehicle, and information about a physical object that exists at the periphery of the vehicle and that is detected by an in-vehicle radar.

The driving assist system described in claim 4 can detect the incident based on the change in the traveling state of the vehicle.

As described above, with the driving assist system according to the present disclosure, it is possible to propose a new function suitable for the user at an appropriate timing.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
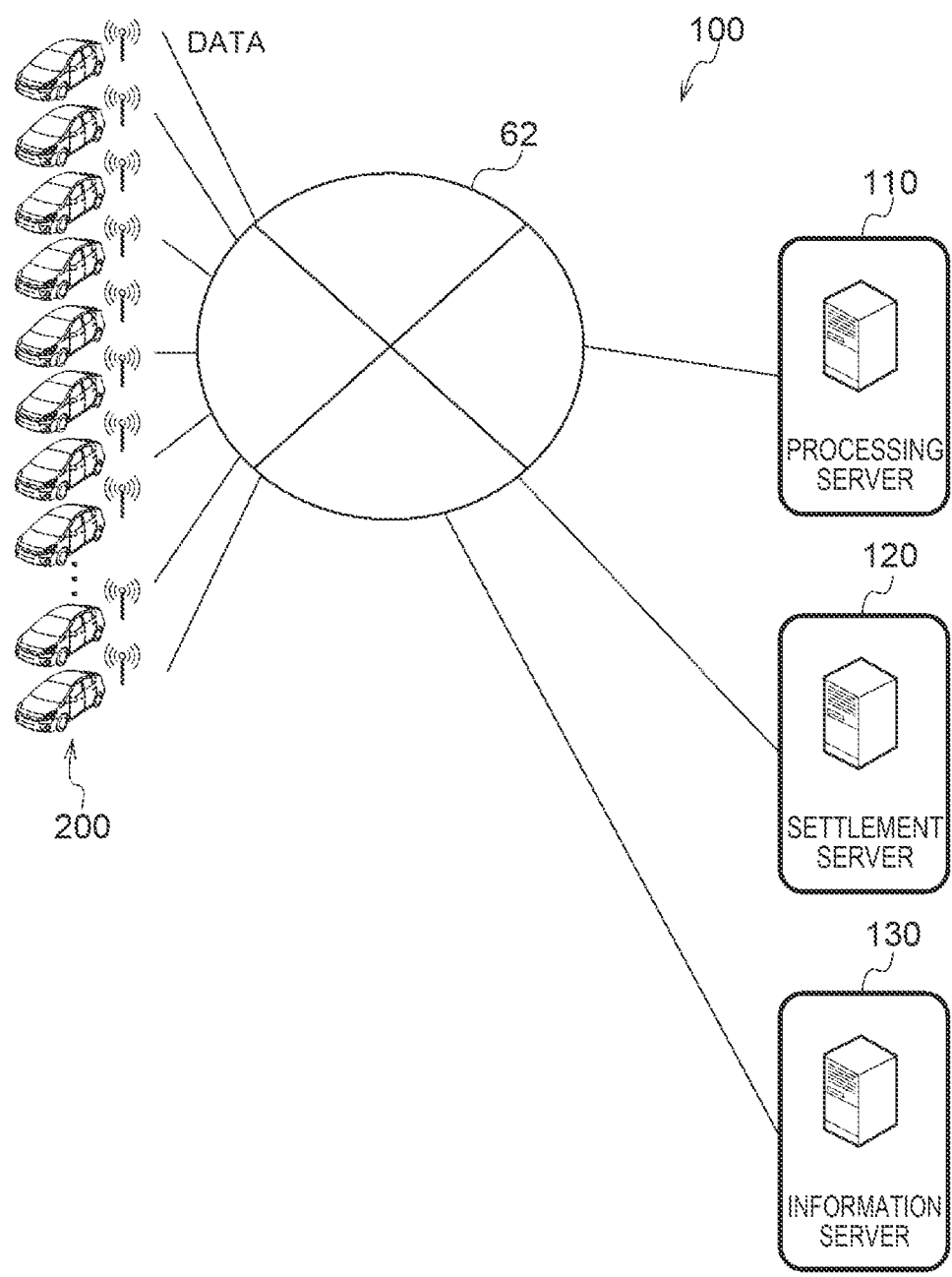
FIG. 1 is a schematic diagram showing an exemplary configuration of a driving assist system according to an embodiment.

A driving assist system 100 according to an embodiment will be described below with use of FIG. 1. A driving assist system 100 shown in FIG. 1 includes a plurality of vehicles 200 each of which is a so-called connected car having an always-on connection function for a network 62, a processing server 110 that selects and provides a new function suitable for a user of each vehicle 200 based on traveling data that is relevant to the vehicle 200 and that is acquired through the network 62, and the like, a settlement server 120 that performs a billing process due to the use of the new function, and an information server 130 that provides, to the processing server 110, information that is used by the processing server 110 for the selection of the new function suitable for the user.

The processing server 110 is a computer that can execute advanced arithmetic processing at high speed. The settlement server 120 is a server that performs settlement for a credit card, a debit card, a prepaid cart or the like in a banking facility or a credit card company. Examples of the information server 130 include a server in Japan Meteorological Agency or the like that can acquire meteorological data when the user experiences an incident, a server in Geospatial Information Authority of Japan or the like that can acquire topography information when the user experiences an incident, and a server in Japan Road Traffic Information Center or the like that can acquire road traffic information when the user experiences an incident. Each of the processing server 110, the settlement server 120, and the information server 130 may be a single server, or may be a cloud in which the processing load can be distributed.

Figure 2:
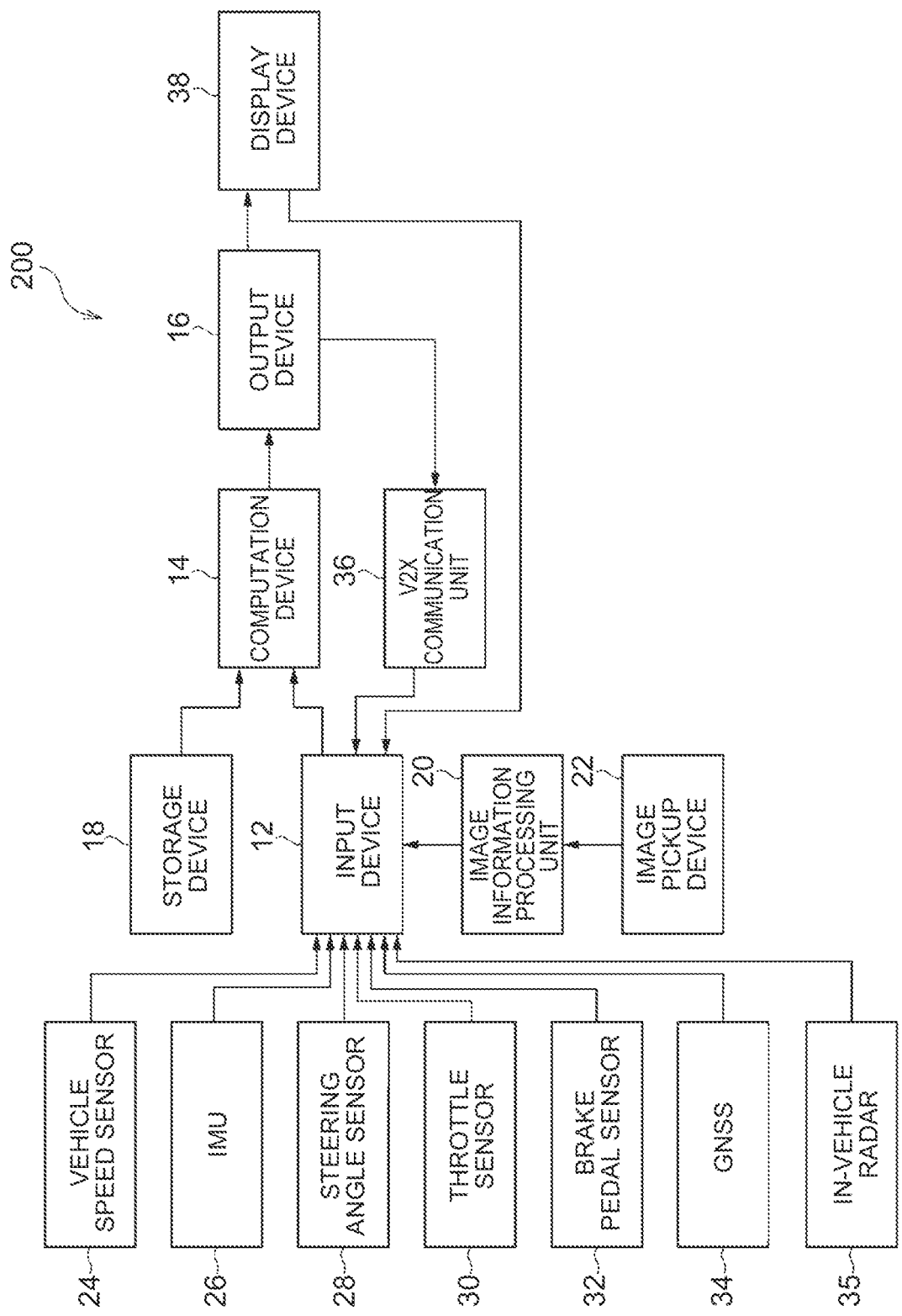
FIG. 2 is a block diagram showing an exemplary configuration of a vehicle.

FIG. 2 is a block diagram showing an exemplary configuration of the vehicle 200. The vehicle 200 is constituted by: a storage device 18 that stores data necessary for the computation by a computation device 14 and computation results of the computation device 14; an image information processing unit 20 that performs processes such as an edge process to image information acquired by an image pickup device 22; an input device 12 that receives the image information that is processed by the image information processing unit 20, the vehicle front-rear speed that is detected by a vehicle speed sensor 24, the azimuth angle deviation and acceleration of the vehicle 200 that is detected by an inertial measurement unit (IMU) 26, the steering angle of the vehicle 200 that is detected by a steering angle sensor 28, the throttle opening degree of the vehicle 200 that is detected by a throttle sensor, the stepping force of a brake pedal of the vehicle 200 that is detected by a brake pedal sensor 32, information about the current position of the vehicle 200 that is detected by a global navigation satellite system (GNSS) device 34, information about a physical object that exists at the periphery of the vehicle 200 and that is detected by an in-vehicle radar 35, and information that is acquired by a V2X communication unit 36 by wireless communication; the computation device 14 that estimates the traveling state of the vehicle 200 as necessary, based on input data input from the input device 12 and data stored in the storage device 18; an output device 16 that outputs the computation result of the computation device 14 to the V2X communication unit 36 and a display device 38; and the display device 38 that displays the information output by the output device 16, to the user in a vehicle cabin. In addition to the brake pedal sensor 32, the vehicle 200 may separately include a master cylinder sensor that detects the pressure in a master cylinder of a brake.

As described above, the vehicle 200 is a so-called connected car. However, instead of the connected car, the vehicle 200 may be a vehicle to which a so-called additionally attached communication apparatus such as Translog and various sensors are added. The communication apparatus analyzes and utilizes traveling data sent from an equipped apparatus that is equipped in the vehicle 200. The various sensors acquire the traveling data.

The image pickup device 22 according to the embodiment is an in-vehicle camera, a drive recorder, or the like, and acquires image data about the periphery of the vehicle 200 and the interior of the vehicle cabin. The vehicle speed sensor 24 may be configured to be capable of detecting the respective speeds of four wheels of the vehicle 200. The display device 38 also has a function of an input device such as a touch screen, and matters input on the touch screen are input to the computation device 14 through the input device 12.

Figure 3:
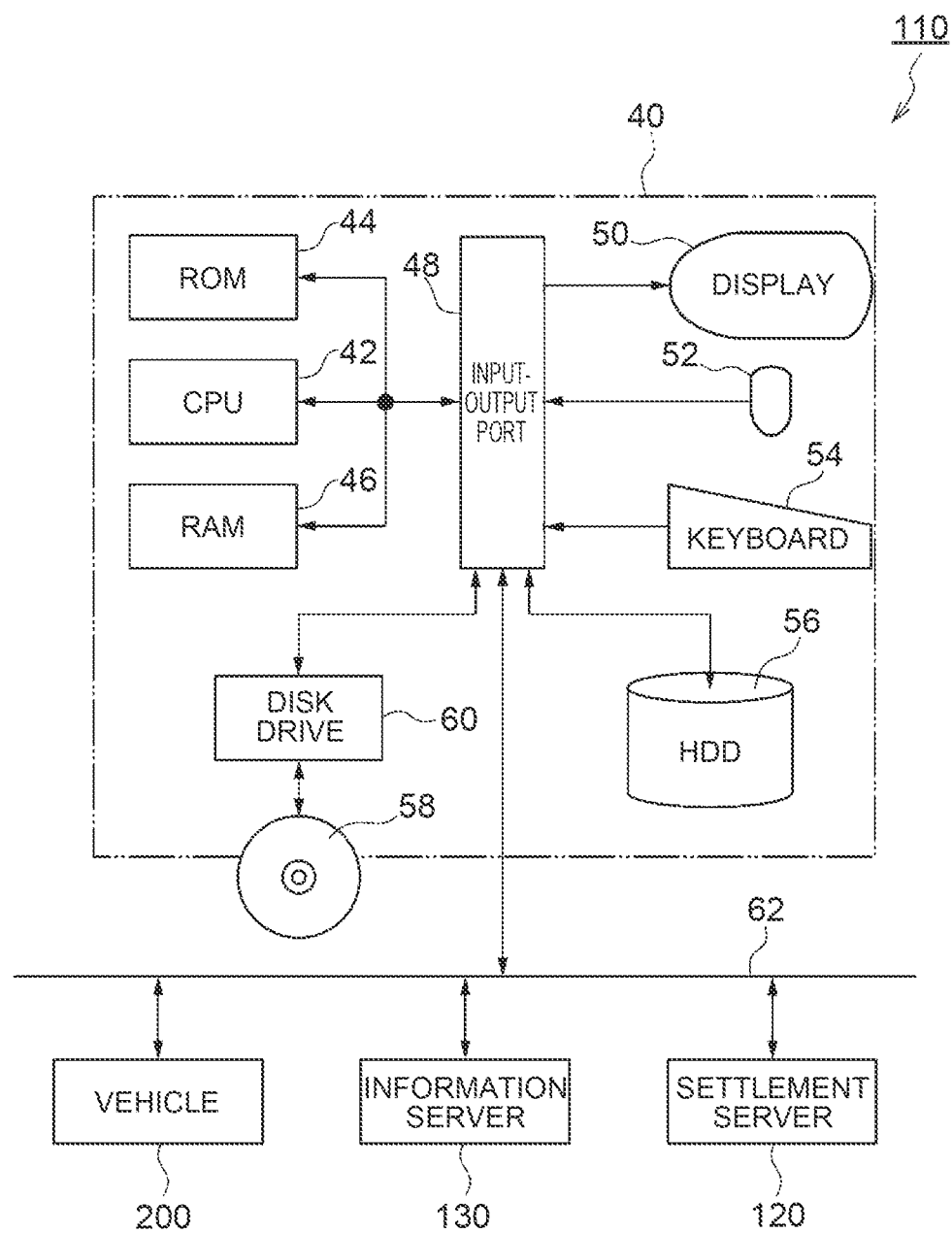
FIG. 3 is a block diagram showing an exemplary specific configuration of a processing server according to the embodiment.

FIG. 3 is a block diagram showing an exemplary specific configuration of the processing server 110 according to the embodiment. The processing server 110 is configured to include a computer 40. The computer 40 includes a central processing unit (CPU) 42, a read only memory (ROM) 44, a random access memory (RAM) 46, and an input-output port 48. As an example, it is preferable that the computer 40 be a model that can execute advanced arithmetic processing at high speed.

In the computer 40, the CPU 42, the ROM 44, the RAM 46, and the input-output port 48 are connected with each other through various buses such as an address bus, a data bus, and a control bus. The input-output port 48 is connected with a display 50, a mouse 52, a keyboard 54, a hard disk (HDD) 56, and a disk drive 60 that reads information from various disks (for example, a CD-ROM, a DVD, and the like) 58, as various input-output apparatuses.

Further, the input-output port 48 is connected with the network 62, and can exchange information with various apparatuses connected with the network 62.

In the HDD 56 of the computer 40, a program for analyzing the state of the vehicle 200 based on the traveling data about the vehicle 200 that is acquired from the vehicle 200, and the like, a program for selecting a new function that is recommended for the user of the vehicle 200, based on the state of the vehicle 200, and a program for calculating a notification timing when the selected new function is proposed to the user of the vehicle 200 are installed.

As the method for installing a program for machine learning in the embodiment in the computer 40, there are some methods. For example, the program is stored in a CD-ROM, a DVD or the like, together with a setup program. Then, the disk is set in the disk drive 60, and the CPU 42 executes the setup program. Thereby, the program is installed in the HDD 56. Alternatively, the program may be installed in the HDD 56, by the communication with another information processing apparatus that is connected with the computer 40 through a public phone line or the network 62.

The CPU 42 of the processing server 110 has a state analysis function, a new-function selection function, and a notification function, by executing the program for analyzing the traveling state, the program for selecting the new function, and the program for calculating the notification timing. By the execution of the programs by the CPU 42, the CPU 42 functions as a state analysis unit, a new-function selection unit, and a notification unit.

Figure 4:
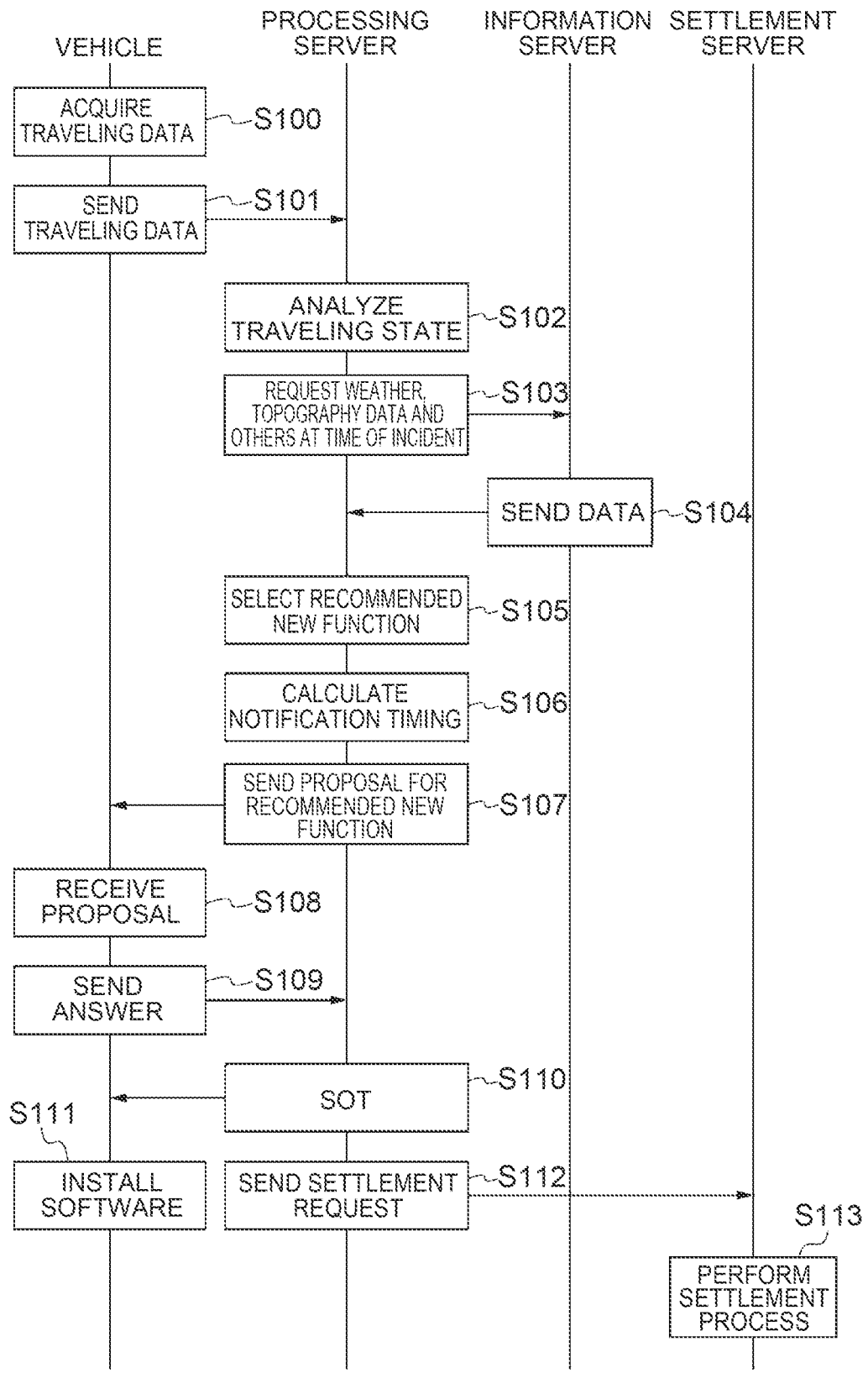
FIG. 4 is a sequence diagram showing an exemplary process in the driving assist system according to the embodiment.

FIG. 4 is a sequence diagram showing an exemplary process in the driving assist system 100 according to the embodiment. In step S100, the vehicle 200 acquires the traveling data such as the vehicle front-rear speed of the vehicle 200, the azimuth angle deviation and acceleration of the vehicle 200, the steering angle of the vehicle 200, the throttle opening degree of the vehicle 200, the stepping force of the brake pedal of the vehicle 200, the information about the physical object that exists at the periphery of the vehicle 200 and that is detected by the in-vehicle radar 35, and the information about the current position of the vehicle 200 that is detected by the GNSS device 34. Then, in step S101, the vehicle 200 sends the acquired traveling data to the processing server.

In step S102, the processing server 110 analyzes the acquired traveling state, as the function of the state analysis unit. Then, in step S103, to the information server 130, the processing server 110 requests data such as the weather, traffic condition and topography at a place where the vehicle 200 exists at the time of the occurrence of an incident that gives the user of the vehicle 200 a scary moment. The detection of the occurrence of the incident is performed based on the change in the vehicle front-rear speed that is detected by the vehicle speed sensor 24, the change in the acceleration of the vehicle 200 that is detected by the IMU 26, the change in the steering angle of the vehicle 200 that is detected by the steering angle sensor 28, the change in the throttle opening degree that is detected by the throttle sensor 30, the change in the brake pedal stepping force that is detected by the brake pedal sensor 32. For example, in the case where the throttle opening degree has rapidly decreased to zero and where the brake pedal stepping force has rapidly increased, the vehicle front-rear speed has rapidly decreased and the acceleration of the vehicle 200 has rapidly become a negative value, or in the case where the steering angle has rapidly changed, it is determined that there is a fear that the incident has occurred. Furthermore, in the case where an abnormal approximation to an obstacle or another vehicle has been detected from the image information about the periphery of the vehicle 200 that is detected by the image pickup device 22 or the detection result of the in-vehicle radar 35, it is determined that the incident has occurred. When the image pickup device 22 can pick up the image of the expression of the user in the vehicle cabin, the occurrence of the incident may be detected from the change in the expression of the user.

The place where the vehicle 200 exists at the time of the incident is based on the position information about the vehicle 200 that is detected by the GNSS device 34. For the determination of the incident occurrence, in the case where the vehicle 200 has been put into the above traveling state when the vehicle 200 has reached a place where an accident easily occurs, as exemplified by an intersection or a blind curve in a mountainous area, it may be determined that the incident has occurred.

In step S104, the information server 130 sends the data such as the weather, traffic condition and topography at the time of the incident, to the processing server 110.

Figure 5:
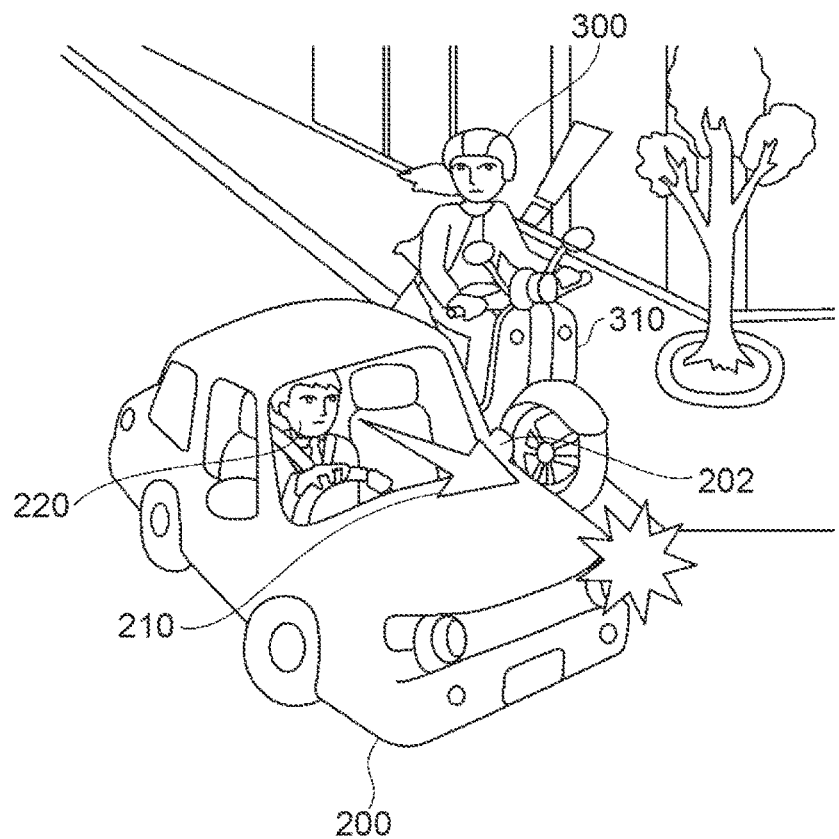
FIG. 5 is an explanatory diagram showing an exemplary incident occurrence.

In step S105, the processing server 110 selects a new function depending on the situation of the incident, as the function of the new-function selection unit. FIG. 5 is a schematic diagram showing a case where the vehicle 200 almost catches a rider 300 on a motorbike 310 at the time of left turn. In FIG. 5, a sight line 210 of a user 220 that is estimated from the change in the expression of the user 220 of the vehicle 200, which is an expression acquired by the image pickup device 22, is not oriented to the rider 300 on the motorbike 310 detected by the image information about the periphery of the vehicle 200, the in-vehicle radar 35 or the like, and is not oriented to a left side mirror 202 of the vehicle 200. In this case, as an example, the processing server 110 selects an "intersection catching prevention automatic braking function" for preventing the catching accident at an intersection.

In step S106, the processing server 110 calculates a timing when notice of the selected new function is given to the user, as the function of the notification unit. A condition of the timing of the notification is that the user having encountered the incident has a clear memory about the incident and the user has cooled down after the incident and is in the ride state. As an example, based on the traveling data that is occasionally sent from the vehicle 200, the processing server 110 gives notice of the proposal for the selected new function, when the vehicle 200 arrives at a garage of the user's home and a parking brake of the vehicle 200 is turned on or a shift position becomes P. In the case where the vehicle 200 is equipped with a car navigation system that cooperates with the GNSS device 34, the vehicle 200 may give notice of the proposal for the selected new function, when the vehicle 200 arrives at a destination registered in the car navigation system and the parking brake of the vehicle 200 is turned on or the shift position becomes P.

Figure 6:
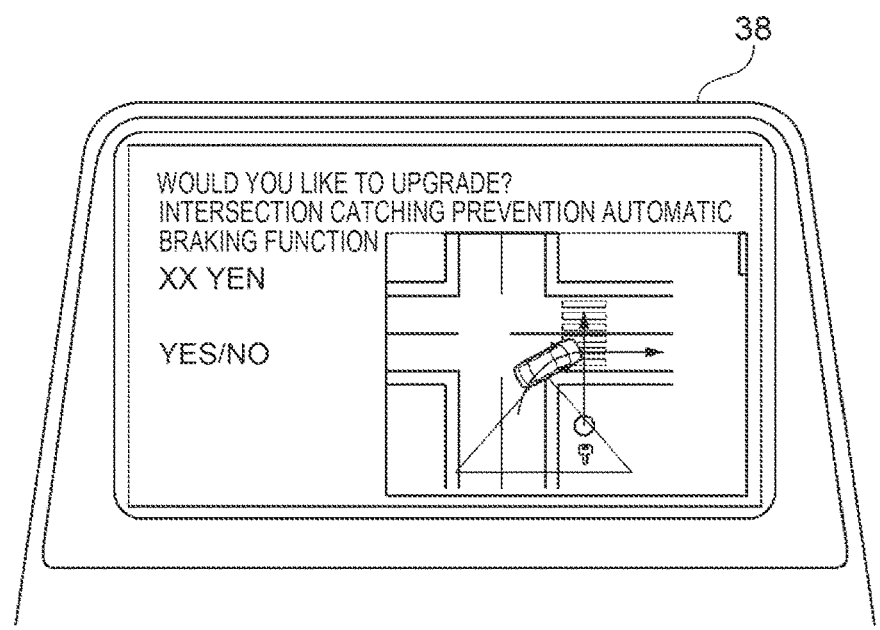
FIG. 6 is a schematic diagram showing an exemplary display that shows a proposal for a selected new function and that is displayed on a display device of the vehicle.

In step S107, the processing server 110 gives notice of the proposal for the selected new function to the vehicle 200 at the calculated timing, as the function of the notification unit. In step S108, the vehicle 200 receives the proposal from the processing server 110. FIG. 6 shows an exemplary display that shows the proposal for the new function and that is displayed on the display device 38 of the vehicle 200.

In step S109, the vehicle 200 sends an answer to the received proposal, to the processing server 110. For example, in the case where the display shown in FIG. 6 is performed on the display device 38, the user answers to the processing server 110, by touching "Yes" or "No".

In step S110, the processing server 110 executes Software Updates Over The Air (SOTA) for supplying software to the vehicle 200 by wireless communication. Then, in step S111, the vehicle 200 installs the software acquired by SOTA, in the storage device 18, such that the computation device 14 can execute the software.

In step S112, in the case where the answer sent from the vehicle 200 is "Yes", the processing server 110 sends a settlement request to the settlement server 120. The settlement request is a request for credit card settlement, debit card settlement, or prepaid card settlement. Then, in step S113, the settlement server performs a predetermined settlement process, and ends the process As described above, with the embodiment, it is possible to propose, to the user, a fare-paying new function corresponding to an incident that gives the user a scary moment, and to encourage the user to introduce the proposed new function. The proposal for the new function to the user is executed at a timing when the incident is resolved, that is, at an estimated timing when the user has cooled down while the user's memory about the incident is clear. Therefore, it is possible to enhance the user's willingness to introduce the new function, even when the new function is a fare-paying function.

In the embodiment, the detection of the occurrence of the incident of the vehicle 200 is performed by the processing server 110. However, the present disclosure is not limited to this. The detection of the occurrence of the incident may be performed by the computation device 14 of the vehicle 200.

In the above embodiment, a mode in which programs are previously stored (installed) in the disk drive 60 or the like has been described. However, the present disclosure is not limited to this. The programs may be provided in a state where the programs are stored in a non-transitory storage medium such as a compact disk read only memory (CD-ROM), a digital versatile disk read only memory (DVD-ROM), and a universal serial bus (USB) memory. Further, the programs may be downloaded from an external device through a network.

Processes that are executed by the CPU with the reading of software (programs) in the above embodiment may be executed by various processors other than the CPU. In this case, examples of the processors include a programmable logic device (PLD) that allows the alteration of the circuit configuration after production, as exemplified by a field-programmable gate array (FPGA), and a dedicated electric circuit that is a processor having a circuit configuration specially designed for the execution of a specific process, as exemplified by an application specific integrated circuit (ASIC). Further, processes may be executed by one of the various processors, or may be executed by combinations of two or more processors constituted by an identical kind of or different kinds of processors (for example, a combination of a plurality of FPGAs, a combination of a CPU and a FPGA, and other combinations). Further, hardware structures of the various processors, more specifically, are electric circuits in which circuit elements such as semiconductor elements are combined.

(Supplement Item 1)

A driving assist system including:

a memory;

at least one processor connected to the memory, in which the processor detects an incident of a vehicle by analyzing one of position information about the vehicle, image information about a periphery of the vehicle, and traveling data about the vehicle, the position information, the image information and the traveling data being acquired from the vehicle, selects a new function corresponding to the incident, and gives notice of a proposal for the new function to the vehicle at a timing when the incident is resolved.

What is claimed is:

1. A driving assist system comprising:

a state analysis unit that detects an incident of a vehicle by analyzing one of position information about the vehicle, image information about a periphery of the vehicle, and traveling data about the vehicle, the position information, the image information and the traveling data being acquired from the vehicle;

a new-function selection unit that selects a new function corresponding to the incident; and a notification unit that gives notice of a proposal for the new function to the vehicle at a timing when the incident is resolved.

2. The driving assist system according to claim 1, wherein the notification unit gives notice of the proposal for the new function to the vehicle, when the state analysis unit detects a case where the vehicle arrives at a garage of a user's home or at a destination registered in a car navigation system included in the vehicle and where a parking brake of the vehicle is turned on or a shift position of the vehicle becomes P.

3. The driving assist system according to claim 2, wherein the new-function selection unit selects the new function by referring to data including a weather, a traffic condition and a topography at a place of occurrence of the incident at a time of the incident, the data being acquired from an information server.

4. The driving assist system according to claim 1, wherein the traveling data includes change in a vehicle front-rear speed of the vehicle, change in an acceleration of the vehicle, change in a steering angle of the vehicle, change in a throttle opening degree of the vehicle, change in a brake pedal stepping force of the vehicle, and information about a physical object that exists at the periphery of the vehicle and that is detected by an in-vehicle radar.

* * * * *